United States Patent
Chandraker

(10) Patent No.: US 9,336,601 B2
(45) Date of Patent: May 10, 2016

(54) SHAPE FROM CAMERA MOTION FOR UNKNOWN MATERIAL REFLECTANCE

(71) Applicant: NEC Laboratories America, Inc., Princeton, NJ (US)

(72) Inventor: Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/528,704

(22) Filed: Oct. 30, 2014

(65) Prior Publication Data

US 2015/0117758 A1 Apr. 30, 2015

Related U.S. Application Data

(60) Provisional application No. 61/897,436, filed on Oct. 30, 2013.

(51) Int. Cl.
*G06K 9/00* (2006.01)
*G06T 7/00* (2006.01)

(52) U.S. Cl.
CPC ............ *G06T 7/0055* (2013.01); *G06T 7/0065* (2013.01); *G06T 2207/10021* (2013.01)

(58) Field of Classification Search
None
See application file for complete search history.

(56) References Cited

PUBLICATIONS

Rodrigo L. Carceroni et al, Multi-View Scene Capture by Surfel Sampling: From Video Streams to Non-Rigid 3D Motion, Shape and Reflectance, IJCV 2002.*
Christian Theobalt et al,Joint Motion and Reflectance Capture for Creating Relightable 3D Videos, MAX—PLANCK—Institut Fur Informatik, 2005.*
Adrien Treuille et al, Example-Based Stereo with General BRDFs, Springer 2004.*
Seitz, S.M. et al. "A Comparison and Evaluation of Multi-View Stereo Reconstruction Algorithms" Proceedings of the IEEE Computer Society Conference on Computer Vision and Pattern Recognition, 2006. (8 Pages).

* cited by examiner

*Primary Examiner* — Mark Roz
(74) *Attorney, Agent, or Firm* — Joseph Kolodka

(57) ABSTRACT

A computer vision method that includes deriving a relationship of spatial and temporal image derivatives of an object to bidirectional reflectance distribution function (BRDF) derivatives under camera motion, and deriving with a processor a quasilinear partial differential equation for solving surfaced depth for orthographic projections using the relationship of spatial and temporal image derivatives without requiring knowledge of the BRDF. The method may further recover surface depth for an object with unknown BRDF under perspective projection.

6 Claims, 5 Drawing Sheets

SHAPE FROM CAMERA MOTION FOR UNKNOWN MATERIAL REFLECTANCE

RELATED APPLICATION INFORMATION

This application claims priority to provisional application Ser. No. 61/897,436 filed on Oct. 30, 2013, incorporated herein by reference.

BACKGROUND

1. Technical Field

The present disclosure relates to strategies for the fundamental computer vision problem of determining shape from small (differential) motion of a camera.

2. Description of the Related Art

Computer vision is a field that includes methods for acquiring, processing, analyzing, and understanding images and, in general, high-dimensional data from the real world in order to produce numerical or symbolic information, e.g., in the forms of decisions. A theme in the development of this field has been to duplicate the abilities of human vision by electronically perceiving and understanding an image. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. One fundamental computer vision problem is determining shape of an object from the small (differential) motion of a camera, for example, when the object has an unknown surface reflectance. In the general case, reflectance can be an arbitrary function of surface orientation, camera and lighting, which can be referred to as the bidirectional reflectance distribution function (BRDF). Shape and camera motion is typically solved under the umbrella of multi-view stereo methods, which rely on Lambertian assumptions, that is, assume that the image intensity does not change with camera motion. This is incorrect for objects formed of typical materials, such as metals and plastics etc.

SUMMARY

These and other drawbacks and disadvantages of the prior art can be addressed by the present principles, which may be applied to the fundamental computer vision problem of determining shape from small (differential) motion of the camera, even when the object has an unknown surface reflectance. For example, the methods disclosed herein allow for the determination of shape from the small or differential motion of the camera for an unknown isotropic bidirectional reflectance distribution function (BRDF). In prior methods, reflectance is an arbitrary function of surface orientation of the object, camera and lighting. The methods, systems and computer products disclosed herein account for reflectance behavior, as an unknown BRDF, relate it to image intensities and demonstrate that it is still possible to recover the shape.

In some embodiments, a general relation is first derived that relates spatial and temporal image derivatives to BRDF derivatives under camera motion. Contrary to initial impressions, it has been determined that directly using the relation for shape recovery is not possible due to a rank deficiency. The form of the relationship is exploited to derive the following for unknown isotropic BRDFs:

(1) For orthographic projections, a first-order quasilinear partial differential equation (PDE) is derived, which can be solved for surface depth using a method of characteristics.

(2) For perspective projections, estimates for depth can be directly made from image derivatives in three or more images. Typically, for perspective images, an additional constraint may be derived for the surface gradient of the object. The depth and surface gradient derivatives may then be combined to yield and efficient solution for surface depth as a sparse linear system.

In one embodiment, a computer vision method is provided that includes deriving with a processor a relationship of spatial and temporal image derivatives of an object to bidirectional reflectance distribution function (BRDF) derivatives under camera motion that provides an image sequence, and deriving a quasilinear partial differential equation for solving surfaced depth for orthographic projections using the relationship of spatial and temporal image derivatives to bidirectional reflectance distribution function (BRDF) derivatives. In a following sequence, the method may include solving the surface depth from the quasilinear partial differential equation, and reconstructing an image of the object from the solving of the surface depth for orthographic projections.

In another aspect, a computer program product is provided that includes a non-transistory computer readable storage medium having computer readable program code embodied therein for performing a method for computer vision, the method including deriving with a processor a relationship of spatial and temporal image derivatives of an object to bidirectional reflectance distribution function (BRDF) derivatives under camera motion that provides an image sequence, and deriving a quasilinear partial differential equation for solving surfaced depth for orthographic projections using the relationship of spatial and temporal image derivatives to bidirectional reflectance distribution function (BRDF) derivatives. In a following sequence, the method may further include solving the surface depth from the quasilinear partial differential equation, and reconstructing an image of the object from the solving of the surface depth for orthographic projections.

In another embodiment, a computer vision method is provided for perspective cameras that includes deriving a relationship of spatial and temporal image derivatives from an object to bidirectional reflectance distribution function (BRDF) derivatives under camera motion that provides an image sequence from at least three images of the object using a processor; and estimating depth from the spatial and temporal image derivatives. In some embodiments, the method may further include deriving a constraint on surface gradient of the object, combining the depth and the constraint of the surface gradient to yield a solution for surface depth for perspective projections as a sparse linear system, and reconstructing an image of the object from the solution for surface depth for perspective projections.

In another aspect, a computer program product is provided that includes a non-transistory computer readable storage medium having computer readable program code embodied therein for performing a method for computer vision, the method including deriving a relationship of spatial and temporal image derivatives from an object to bidirectional reflectance distribution function (BRDF) derivatives under camera motion that provides an image sequence from at least three images of the object using a processor, and estimating depth from the spatial and temporal image derivatives. In some embodiments, the method of the computer program product may further include deriving a constraint on surface gradient of the object, combining the depth and the constraint of the surface gradient to yield a solution for surface depth for perspective projections as a sparse linear system, and reconstructing an image of the object from the solution for surface depth for perspective projections.

In another embodiment of the present disclosure, a system for computer vision is provided that includes a spatial and temporal image derivative module for deriving a relationship of spatial and temporal image derivatives from an object to bidirectional reflectance distribution function (BRDF) derivatives under camera motion using a processor. The system may further include an orthographic module for deriving with a processor a quasilinear partial differential equation for solving surfaced depth for orthographic projections using the relationship of spatial and temporal image derivatives to bidirectional reflectance distribution function (BRDF) derivatives, solving the surface depth from the quasilinear partial differential equation, and reconstructing an image of the object from the solving of the surface depth for orthographic projections. The system may also include a perspective module for estimating depth from the spatial and temporal image derivatives, deriving a constraint on surface gradient of the object, combining the depth and the constraint of the surface gradient to yield a solution for surface depth for perspective projections as a sparse linear system, and reconstructing an image of the object from the solution for surface depth for perspective projections.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The methods, systems and computer products disclosed herein account for reflectance behavior, as an unknown BRDF, relate it to image intensities, and demonstrate that it is still possible to recover the shape. In general, one contribution of the present disclosure is that object shape may be reconstructed using an image sequence, even with unknown BRDF, for both orthographic and perspective projections.

Figure 1:
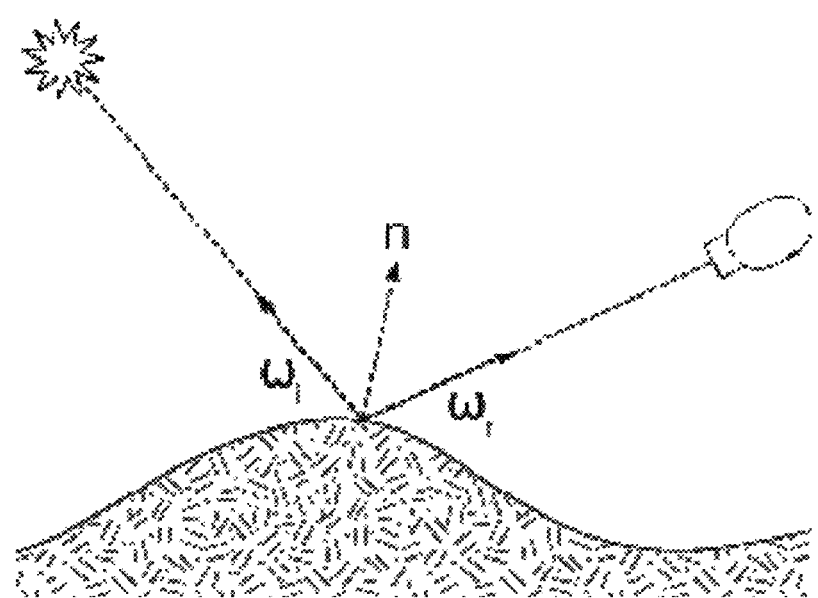
FIG. 1 is a pictorial view depicting the elements that are considered when calculating the bidirectional reflectance distribution function (BRDF).

As used herein, the term "bidirectional reflectance distribution function (BRDF)" is a four-dimensional function that defines how light is reflected at an opaque surface. The function takes a negative incoming light direction, $\omega_i$, and outgoing direction, $\omega_r$, both defined with respect to the surface normal, n, and returns the ratio of reflected radiance exiting along $\omega_r$ to the irradiance incident on the surface from direction $\omega_i$. Each direction $\omega$ is itself parameterized by azimuth angle $\phi$ and zenith angle $\theta$, therefore the BRDF as a whole is 4-dimensional. The BRDF has units $sr^{-1}$, with steradian (sr) being a unit of solid angle. Referring to FIG. 1, the definition for BRDF may be:

$$f_r(\omega_i, \omega_r) = \frac{dL_r(\omega_r)}{dE_i(\omega_i)} = \frac{dL_r(\omega_r)}{L_i(\omega_i)\cos\theta_i d\omega_i} \quad \text{Equation (1)}$$

where L is radiance, or power per unit solid-angle-in-the-direction-of-a-ray per unit projected-area-perpendicular-to-the-ray, E is irradiance, or power per unit surface area, and $\varnothing_i$ is the angle between $\omega_i$ and the surface normal, n. The index i indicates incident light, whereas the index r indicates reflected light.

In some embodiments, a general relation is first derived that relates spatial and temporal image derivatives to BRDF derivatives under camera motion. It has been determined that despite initial impressions, it is not possible to directly use the relation for shape recovery due to a rank deficiency. The methods, structures and computer products that are disclosed herein, exploit the form of the relationship to derive isotropic BRDFs for orthographic projections and perspective projections. As used herein, the term "orthographic projection" (or orthogonal projection) is a means of representing a three-dimensional object in two dimensions. In some embodiments, orthographic projection is a form of parallel projection, where all the projection lines are orthogonal to the projection plane, resulting in every plane of the scene appearing in affine transformation on the viewing surface. It can be further divided into multi-view orthographic projections and axonometric projections. In some examples, a lens providing an orthographic projection is known as an (object-space) telecentric lens. A "weak" perspective projection uses the same principles of an orthographic projection, but requires the scaling factor to be specified, thus ensuring that closer objects appear bigger in the projection, and vice-versa. When the human eye views a scene, objects in the distance appear smaller than objects close by—this is known as "perspective". While "orthographic projection" ignores this effect to allow accurate measurements, a "perspective projection" definition shows distant objects as smaller to provide additional realism.

In some embodiments, the form of the general relationship is first derived that relates spatial and temporal image derivatives to BRDF derivatives under camera motion can be exploited to derive the following for unknown isotropic BRDFs for orthographic projections, in which a first-order quasilinear partial differential equation (PDE) is derived that can be solved for surface depth using a method of characteristics. The method of characteristics is a technique for solving partial differential equations. The method is to reduce a partial differential equation to a family of ordinary differential equations along which the solution can be integrated from some initial data given on a suitable hypersurface. For example, for a first-order PDE (partial differential equations), the method of characteristics discovers curves (called characteristic curves or just characteristics) along which the PDE becomes an ordinary differential equation (ODE). Once the ODE is found, it can be solved along the characteristic curves and transformed into a solution for the original PDE.

In some embodiments, for perspective projections, it has been determined that depth may be directly estimated from image derivatives in three or more images. For example, for perspective images, an additional constrained may be derived for the surface gradient. A constraint is a condition of an optimization problem that the solution must satisfy. As will be described herein, the depth and gradient constraints may be combined to yield an efficient solution for surface depth as a sparse linear system. Further details regarding the methods, systems and computer products for determining shape of an object being viewed using motion of the camera regardless of knowing the surface reflectance of the object that are disclosed herein may now be discussed in greater detail with reference to FIGS. 2-6.

Figure 2:
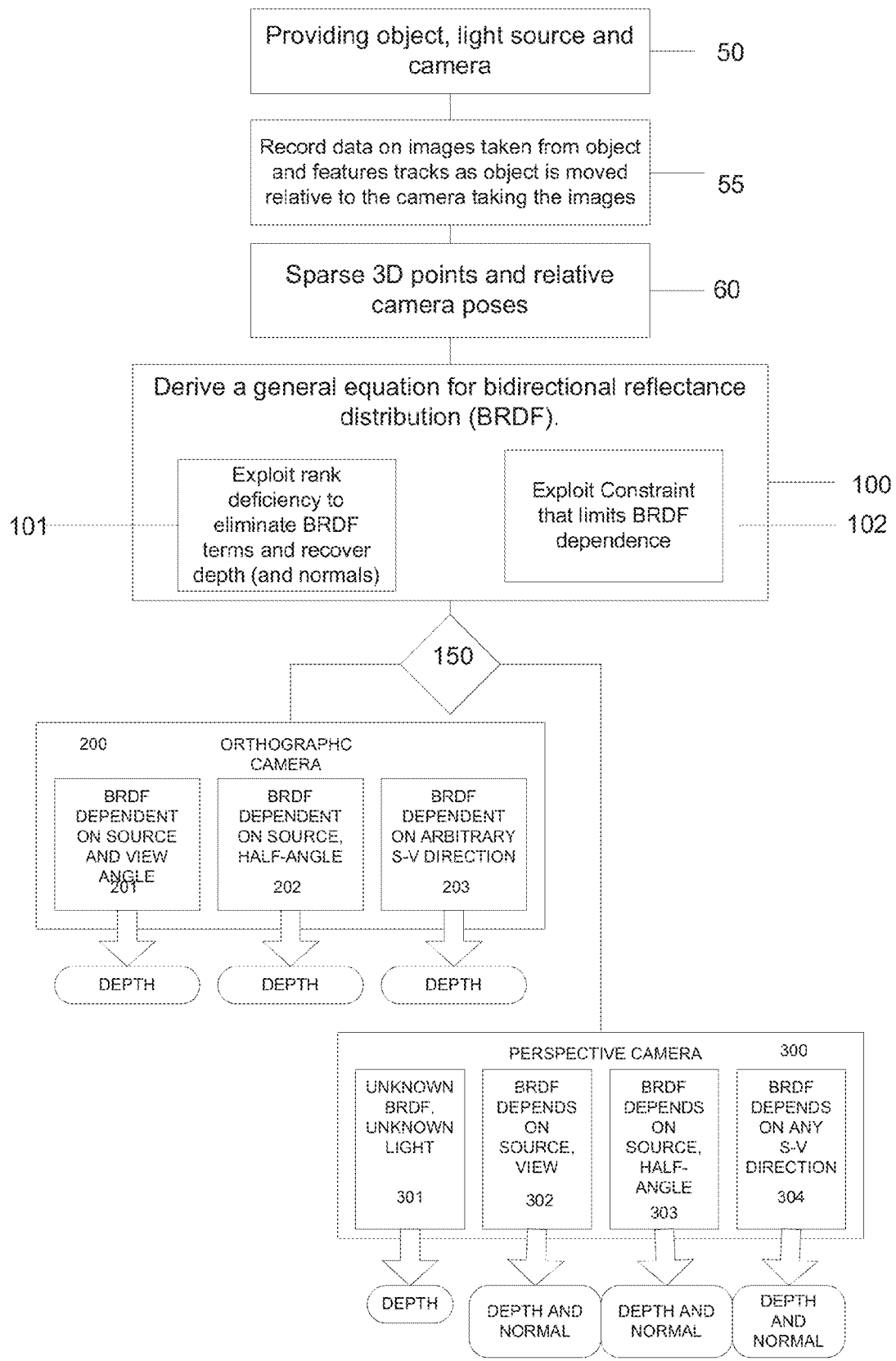
FIG. 2 is a block/flow diagram of a system and method for determining shape of an object being viewed using motion of the camera regardless of knowing the surface reflectance of the object using a bidirectional reflectance distribution function, in accordance with one embodiment of the present disclosure.
Figure 3:
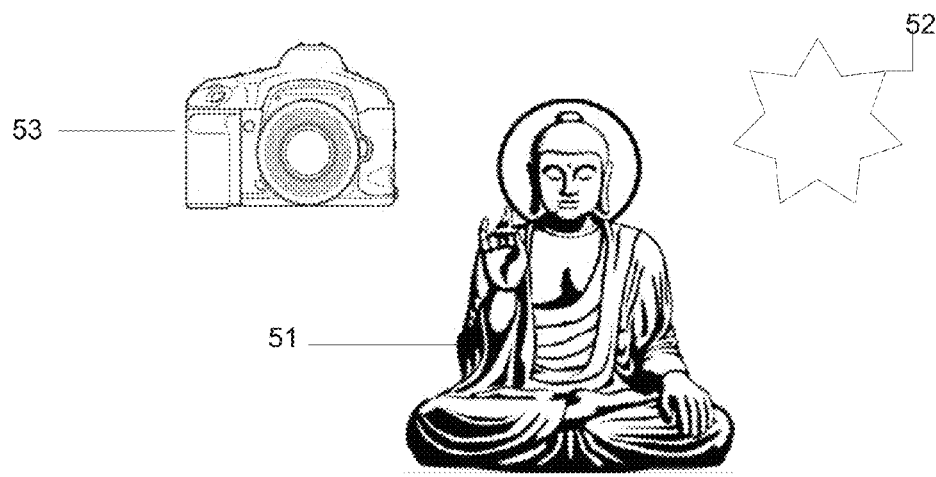
FIG. 3. is a pictorial view of the object, light source, and camera, as used in one embodiment of the present disclosure.
Figure 4:
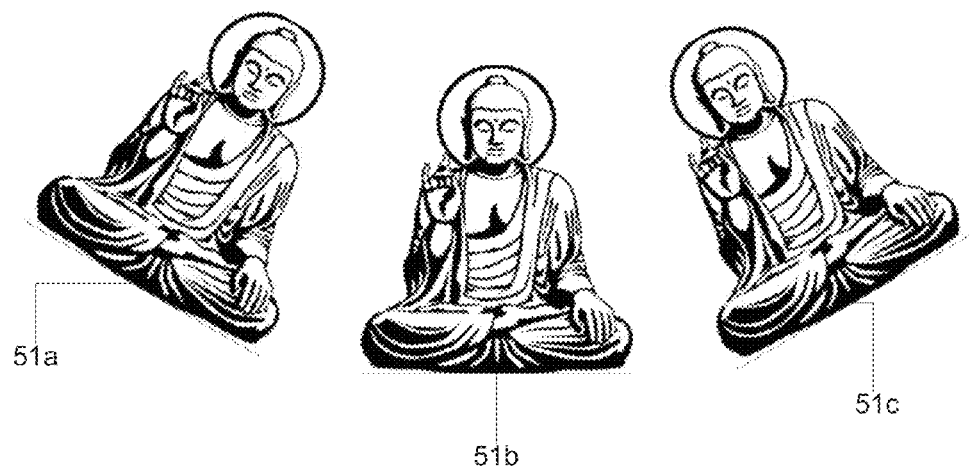
FIG. 4 is a pictorial view of object positioning in response to camera motion for determining images and feature tracks, as used in one embodiment of the present disclosure.

FIG. 2 is a block/flow diagram of a system and method for determining shape of an object being viewed using motion of the camera regardless of knowing the surface reflectance of the object using a bidirectional reflectance distribution function (BRDF). The method may begin with step 50, which includes providing the object from which the image is taken. Referring to FIG. 3, the object 51 may have a surface composed of any material, such as plastic, metal, ceramic, cloth, composite or any combination thereof. The object 51 may be any solid object having a fixed geometry. A light source 52 is also provided to illuminate the object 51, and a camera 53 is employed to take images from the object 51. The camera 53 may be an orthographic camera or a perspective camera. The camera 53 may be in motion while images are taken from the object. At step 55, data is recorded on the images taken from the object 51 and feature track as the object and camera are moved to provide camera motion. FIG. 4 depicts the motion of the object 51a, 51b, 51c as the object and camera are moved to provide camera motion. The position, i.e., feature track, of the object identified by reference number 51a may be expressed by equation: $[I+[w_1]_x|0]$. The position, i.e., feature track, of the object identified by reference number 51b may be expressed by equation: $[I|0]$. The position, i.e., feature track, of the object identified by reference number 51c may be expressed by equation: $[I+[w_2]_x|0]$. Referring to FIG. 2, at step 60, 3D points are sparsed for the image and feature tracks, as well as the relative camera positions ($w_i$, $t_i$).

Figure 5:
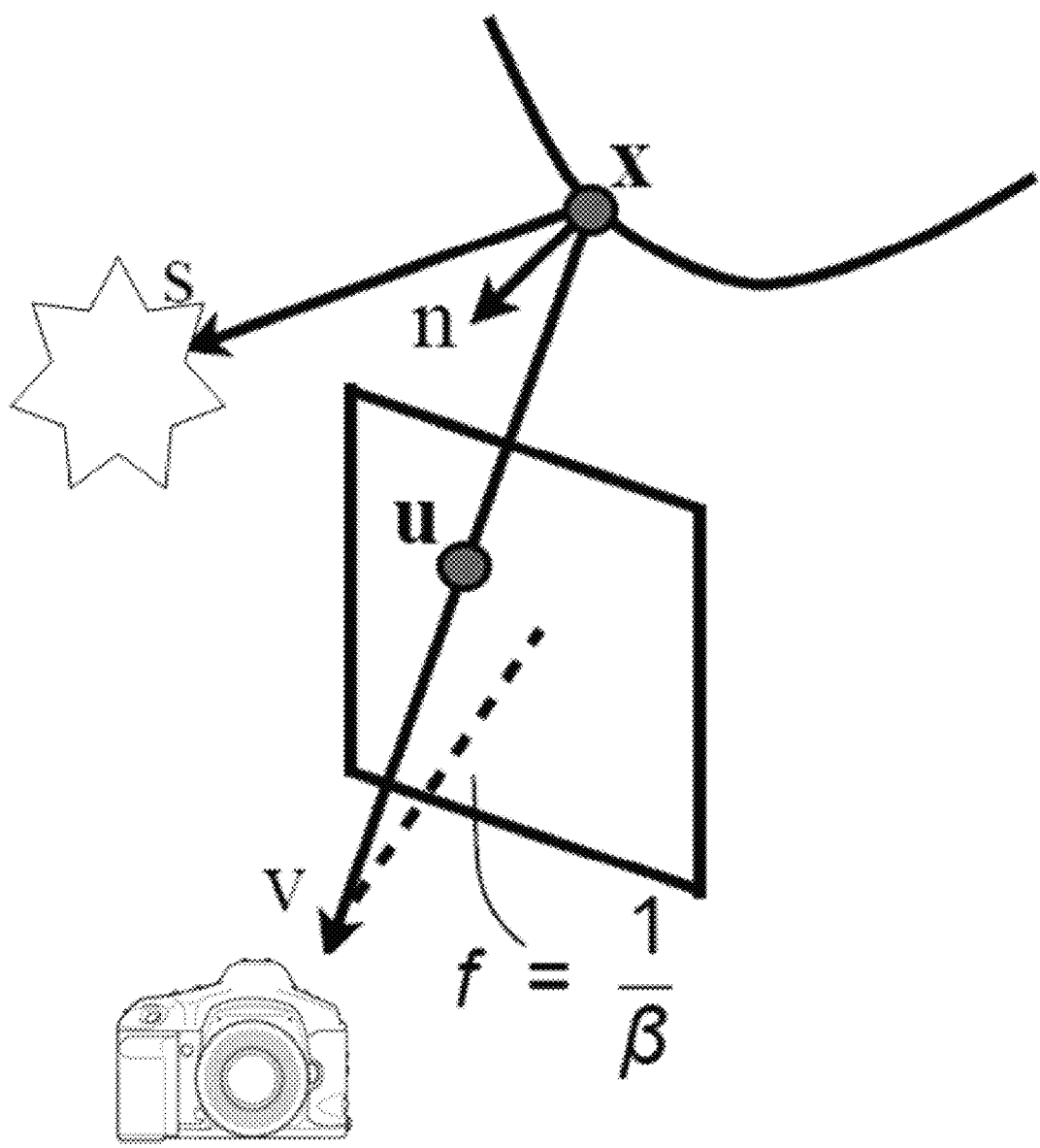
FIG. 5 is a pictorial view illustrating the notation used in general bidirectional reflectance distribution function (BRDF), as used in one embodiment of the present disclosure.

In a following process step, at step 100, a relation for a general bidirectional reflectance distribution function (BRDF) is derived and it is related to surface depth of the image of the object. This is one step of some embodiments of the present disclosure that is distinguishable from prior imaging methods, in which prior imaging methods rely upon diffuse reflectance and brightness constancy. In some embodiments, the differential stereo relation for a general bidirectional reflectance distribution function (BRDF) is as follows, in which image formation at time t:

$$I(u,t)=\sigma(x)\rho(x,n,s,v), \qquad \text{Equation (2)}$$

wherein n is the surface normal, s is the light direction, v is the viewing direction, and f is the focal length, as depicted in FIG. 5. Further, x=(x, y, z) is the object point, and u=(u, v) is the image point. $\sigma(x)$ may be the albedo, i.e., reflection coefficient, and $\rho(x, n, s, v)$ is an expression for the BRDF. The total derivative of equation (2) is as follows:

$$I_u \dot{u} + I_v \dot{v} + I_t = \sigma \frac{d}{dt}\rho(n,x) + \rho \frac{d\sigma}{dt} \qquad \text{Equation (3)}$$

In some embodiments, the albedo is intrinsic on the surface, so its total derivative is zero. The lighting is configured to be distant, so BRDF spatial derivative is also zero. Taking logarithms eliminates albedo. In some embodiments, the differential stereo relation can be equal to:

$$(\nabla_u E)^T \mu + E^T = (n \times \nabla_n \log p + s \times \nabla_s \log p)\omega, \qquad \text{Equation (4)}$$

in which $\mu$ is the motion field, and $\omega$ is the angular velocity, and E=log(I).

One embodiment of an equation for surface depth for use with the relation for the general bidirectional reflectance distribution function (BRDF) that is derived and is related to surface depth of the image of the object at step 100, is as follows:

$$pz+q=\omega^T \pi \qquad \text{Equation (5)}$$

Referring to FIG. 2, at step 101, a rank deficiency is exploited to eliminate BRDF terms and recover depth (and normals). In some examples, one differential motion of the camera is insufficient to extract depth. At step 101, rank deficient relations are considered across the image sequence for an orthographic camera, and a perspective camera.

For an orthographic camera, the motion field may be equal to:

$$\mu = \begin{bmatrix} -v\omega_3 + \tau_1 + \omega_2 z \\ v\omega_3 + \tau_2 - \omega_1 z \end{bmatrix} \qquad \text{Equation (6)}$$

The form of differential stereo relationship for an orthographic camera may be:

$$pz+q=\omega^T \pi.$$

For a perspective camera, the motion field may be equal to:

$$\mu = \begin{bmatrix} \omega_2 \beta u^2 - \omega_1 \beta uv - \omega_3 v + \\ \frac{1}{1+\beta z}(\tau_1 - \beta u \tau_3 + \omega_2 z) \\ -\omega_1 \beta v^2 - \omega_2 \beta uv - \omega_3 u + \\ \frac{1}{1+\beta z}(\tau_2 - \beta u \tau_3 + \omega_1 z) \end{bmatrix} \qquad \text{Equation (7)}$$

The form of differential stereo relationship for a perspective camera may be:

$$p'\left(\frac{z}{1+\beta_z}\right) + r'\left(\frac{z}{1+\beta_z}\right) + q' = \omega^T \pi \qquad \text{Equation (8)}$$

In either the orthoscopic camera or perspective camera case, the form of p is $p=E_u \omega_2 - E_v \omega_1$. The matrix with rows [p, q, w] from the different images is rank deficient. In some embodiments, this rank deficiency can be used to eliminate BRDF (and lighting) dependency.

Referring to FIG. 2, at step 102, a constraint is exploited that limits the BRDF dependence. For example, in some embodiments, the form of a depth-normal-BRDF relationship may be employed. The motion field for an orthographic camera may be provided by Equation (6), and the motion field for a perspective camera may be provided by Equation (7). The form of differential stereo relationship for an orthographic camera may be provided by:

$$p^i z + q^i = \pi^T \omega^i, \; i=1,\ldots,m \qquad \text{Equation (9)}$$

The form of differential stereo relationship for a perspective camera may be provided by:

$$(p^e + \beta p^e) z - ((1+\beta z)\pi)^T \omega^i + (p^e + r^e) = 0 \qquad \text{Equation (10)}$$

In either the orthoscopic camera or perspective camera case, $\pi^T v = 0$. This constraint may be used to eliminate BRDF and arbitrary unknown lighting.

Referring to FIG. 2, at step 150, a decision is made as to whether an orthographic or perspective camera is to be employed for determining the shape of the object.

When employing an orthographic camera at step 200, in some embodiments, the rank deficiency of step 101 is employed to recover depth. The rank deficiency of step 101 may be employed to recover depth when the BRDF model depends on light source and view directions in step 201. Some reflectance depends on the angles subtended by the normal on the source and view directions. Such BRDFs can explain the darkening near image edges for materials like fabrics. The analysis conducted in step 201 may be suitable for objects having a surface similar to fabrics.

In this scenario, the light direction is unknown. In some embodiments, using two or more differential motions of the camera, we may eliminate BRDF terms to derive a homogeneous quasilinear partial differential equation (PDE) in surface depth. In some embodiments, the PDE can be solved to recover level curves of the surface using a method of characteristics. In some embodiments, the level curves are interpolated to recover dense depth. In step 201, the BRDF typically depends upon light direction (s) and viewing direction (v). The modeling for orthographic camera's under this scenario typically includes a isotropic BRDF, as such:

$$\log p(n,s,v) = \bar{p}(n^T s, n^T v) \qquad \text{Equation (11)}$$

The differential stereo equations in accordance with step 201 may be as follows:

$$pz + q = \omega^T \pi \qquad \text{Equation (12)}$$

$$\pi = n \times \nabla n \bar{p} + s \times \nabla s \bar{p} = n \times (\bar{p}\theta s + \bar{p}\phi v) + s \times \bar{p}\theta n = \bar{p}\phi n \times v = v \qquad \text{Equation (13)}$$

In some embodiments, a key step of recovering depth data in step 201 is to eliminate BRDF using the rank deficiency across two or more images. One example of a constraint on surface depth and gradient that is independent of both BRDF and lighting is as follows:

$$[(\gamma_2 + E_v \gamma_1) - E_v z] z_x + [(\gamma_3 - E_u \gamma_1) + E_u z] z_y = 0 \qquad \text{Equation (14)}$$

Equation (14) is an example of a homogenous quasilinear PDE.

One reconstruction method at step 201 may include recovering level curves using a method of characteristics, and to interpolate level curves to recover dense depth. A second reconstruction method may include to discretize the quasilinear PDE, and solving for depth as a nonlinear optimization problem.

Under orthography, for a BRDF of unknown functional form that depends on light and view directions, two differential motions of the camera may suffice to yield a constraint of surface depth independent of BRDF and lighting.

Step 202 illustrates another BRDF model in accordance with the present disclosure that employs an orthographic camera. The BRDF model at step 202 depends on light source and half-angle directions. The BRDF model illustrated by step 202 may be suitable for use with objects composed of materials like metals and plastics. For many common materials like metals and plastics, it is reasonable to assume that the reflectance depends on the angle between the surface normal and the half-angle between the source and view directions. For a surface of such material type, it can be shown that a sequence of differential stereo relations yields a BRDF-invariant constraint on surface depth. In this embodiment, the light direction is known. In some embodiments, using two or more differential motions of the camera, BRDF terms may be eliminated to derive an inhomogeneous quasilinear PDE in surface depth. This PDE can be solved to recover characteristic curves of the surface. The characteristic curves are interpolated to recover dense depth.

In some embodiments, an isotropic BRDF equation for use with step 202 may be as follows:

$$\bar{p}(n^T s, n^T h) = \log p(n,s,v) \qquad \text{Equation (15)}$$

In some embodiments, the differential stereo equations for use with step 202 include the following:

$$pz + q = \omega^T \pi \qquad \text{Equation (16)}$$

$$\pi = \bar{p} n \left[ \frac{n \times v}{\|s + v\|} - \frac{(n^T h) s \times v}{\|s + v\|^2} \right] \qquad \text{Equation (17)}$$

In some embodiments, step 202 includes eliminates BRDF using a rank deficiency across 2 or more images. One example of a inhomogeneous quasilinear PDE suitable for use with step 202 is as follows:

$$\text{Equation: } (\lambda_1 + \lambda_2 z) z_x + (\lambda_3 + \lambda_4) z_y + \lambda_5 = 0 \qquad \text{Equation (18)}$$

One image reconstruction method for use with step 202 may include recovering characteristic curves using the method of characteristics, and interpolating characteristic curves to recover dense depth. Another image reconstruction method for use with step 202 may include to discretize the quasilinear PDE, and to solve for depth as a nonlinear optimization problem.

Under orthographic projection, for a BRDF of unknown functional form that depends on known light and half-angle directions, two different motions of the camera suffice to yield a BRDF-invariant constraint on surface depth.

Step 203 illustrates another BRDF model in accordance with the present disclosure that employs an orthographic camera. The BRDF model in step 203 depends on light source and arbitrary direction in the source-view plane, i.e., dependence on arbitrary angle {s, v}-plane. It has been determined that measured BRDF's show that reflectance functions often depends on the angles the surface normal makes with the light source and another direction in the plane defined by the source and camera directions. In step 203, the light direction is known. In some embodiments, using 2 or more differential motions of the camera, BRDF terms may be eliminated to derive an inhomogeneous quasilinear PDE for surface depth. This PDE can be solved to recover characteristic curves of the surface. The characteristic curves are interpolated to recover dense depth.

One example of an isotropic BRDF equation is as follows:

$$\log p(n, s, v) = \bar{p}(n^T s, n^T y), \qquad \text{Equation (19)}$$
where

-continued $$y = \frac{s+kv}{\|s+kv\|} \quad \text{Equation (20)}$$

In one example, the differential stereo equations for use in step 203 may include:

$$pz + q = \omega^T \pi, \quad \text{Equation (21)}$$
and $$\pi = \frac{Pn^T y}{(2(1+k\emptyset))^{\frac{3}{2}}}[2k(1+k\emptyset)n - (\emptyset + k\varphi)s] \times v \quad \text{Equation (22)}$$

Step 203 may include eliminating BRDF using a rank deficiency across two or more images. One example of an inhomogeneous quasilinear PDE for use in step 203 may be as follows:

$$(\lambda'_1 + \lambda'_2 z)z_x + (\lambda'_3 + \lambda'_4)z_y + \lambda'_5 = 0 \quad \text{Equation (23)}$$

One image reconstruction method for use with step 203 may include recovering characteristic curves using the method of characteristics, and interpolating characteristic curves to recover dense depth. Another image reconstruction method for use with step 202 may include to discretize the quasilinear PDE, and to solve for depth as a nonlinear optimization problem.

Under orthographic projection, for a BRDF of unknown functional form that depends on light source and an arbitrary direction in the source-view plane, two different motions of the camera can suffice to yield a BRDF-invariant constraint on surface depth.

Given depths at a few points on a surface with unknown BRDF, the above propositions from at least one of steps 201, 202, and 203, yield depths along certain characteristic curves. For a smooth surface, one may interpolate the depths between the curves, in order to recover depth for the whole surface.

At step 300, shape recovery is considered from differential stereo under perspective projection. In particular, unlike the orthographic case, depth may be unambiguously recovered in the perspective case, even when both the BRDF and the lighting are unknown. In some embodiments, the rank deficiency in step 101 can be used to estimate depth for perspective cameras.

At step 301, for a perspective camera, when the BRDF is unknown, i.e., arbitrary, and the light direction is unknown, i.e., unknown lighting, it has been determined that by using 3 or more differential motions of the camera, BRDF terms may be eliminated to recover surface depth. The methods employed in step 301 may be applied to images taken from objects made of arbitrary, unknown materials. Modeling at step 301 may include isotropic BRDF equations as follows:

$$\tilde{p}(n^T s, s^T v, n^T v) = \log p(n, s, v) \quad \text{Equation (24)}$$

In one example, the differential stereo equations for use in step 203 may include the following:

$$\text{Differential Stereo: } p'\left(\frac{z}{1+\beta z}\right) + r'\left(\frac{1}{1+\beta z}\right) + q' = \omega^T \pi \quad \text{Equation (25)}$$

$$c^i = [-(p^{ri} + \beta q^{ri}), \omega_1^i, \omega_2^i]^T \quad \text{Equation (26)}$$

-continued $$\hat{C}\begin{bmatrix} z \\ (1+\beta z)\pi_1 \\ (1+\beta z)\pi_2 \end{bmatrix} = q' + r' \quad \text{Equation (27)}$$

At step 301, the BRDF may be eliminated across 3 or more images with the following equation that provides image depth: $z = \epsilon_1$. The reconstruction method employed in step 301 may include recovering depth directly using $z = \epsilon_1$, followed by regularizing for smoothness with the equation: $\text{Norm}([z_x, z_y])$. Under perspective projection, three differential trial motions of the camera suffice to yield a depth of a surface with unknown isotropic BRDF and unknown light source.

In step 302 the BRDF model depends on light source and view directions, i.e., the BRDF depends on s, v. The light direction is unknown. The methods disclosed in step 302 may be suitable for materials, such as fabrics. In some embodiments, three or more differential motions of the camera, may be used to eliminate BRDF terms to recover surface depth and the slope of gradient. The two sources of surface information may be combined in a joint optimization that is highly sparse and suitable for dealing with noise. In accordance with some embodiments of the present disclosure, the isotropic BRDF equation for use with step 302 may be as follows:

$$\log p(n, s, v) = \bar{p}(n^T s, n^T v) \quad \text{Equation (28)}$$

In some embodiments, the differential stereo equation that may be applied to step 302 may include the following equations:

$$p'\left(\frac{z}{1+\beta z}\right) + r'\left(\frac{z}{1+\beta z}\right) + q' = \omega^T \pi, \quad \text{Equation (29)}$$

where $$\pi = \quad \text{Equation (30)}$$
$$n \times \nabla n\bar{p} + s \times \nabla_s \bar{p} = n \times (\bar{p}\emptyset s + \bar{p}\varphi v) + s \times \bar{p}\emptyset n = \bar{p}\emptyset n \times v$$

In some embodiments, the process illustrated in step 302 may eliminate BRDF using three or more images in which the depth is provided by $z = \epsilon_1$, and the gradient ratio is provided by $l_1 z_x + l_2 z_y + l_3 = 0$, with $l_1 = e_3$, $l_2 = -e_2$. The equation for the gradient ratio is a linear constraint.

One example of an image reconstruction method for use with step 302 is to recover depth directly using the equation $z = \epsilon_1$, and to regularize for smoothness with norm $([z_x, z_y])$. In another example, an image reconstruction method for use with step 302 may include solving a combined system provided by:

$$\min_z (z - \epsilon_1)^2 + \lambda(l_1 z_x + l_2 z_y + l_3)^2, \quad \text{Equation (31)}$$

which is a joint depth and gradient optimization weighted by $\lambda$, and which may be solved by the constraint $l_1 z_x + l_2 z_y + l_3 = 0$. With standard difference, the above is a highly sparse system in z which may be solved efficiently.

At step 303, for a perspective camera, the BRDF model depends on light source and half-angle directions, i.e., BRDF depends on s, h. In this example, the light direction is known. The method described in step 303 is applicable to objects made of materials like metals and plastics. In some embodiments, using three or more differential motions of the camera, BRDF terms may be eliminated to recover surface depth and a linear constraint on the gradient. The two sources of surface information may be combined in a joint optimization that is highly sparse and can better deal with noise. Modeling at step 303 may include isotropic BRDF equations as follows:

$$\overline{p}(n^T s, n^T h) = \log p(n, s, v) \quad \text{Equation (32)}$$

In some embodiments, the differential stereo equation that may be applied to step 303 may include the following equations:

$$p'\left(\frac{z}{1+\beta z}\right) + r'\left(\frac{1}{1+\beta z}\right) + q' = \omega^T \pi, \quad \text{Equation (33)}$$

where $$\pi = \overline{p}_n \left[ \frac{n \times v}{\|s+v\|} - \frac{(n^T h)s \times v}{\|s+v\|^2} \right]$$

In some embodiments, the process illustrated in step 303 may eliminate BRDF using three or more images in which the depth is provided by $z=\epsilon_1$, and the gradient ratio is provided by $l_1 z_x + l_2 z_y + l_3 = 0$, with $l_1 = e_3$, $l_2 = -e_2$. The equation for the gradient ratio is a linear constraint.

One example of an image reconstruction method for use with step 303 is to recover depth directly using the equation $z=\epsilon_1$, and to regularize for smoothness with norm($[z_x, z_y]$). In another example, an image reconstruction method for use with step 303 may include solving a combined system provided by:

$$\min_z \ (z-\epsilon_1)^2 + \lambda(l_1 z_x + l_2 z_y + l_3)^2, \quad \text{Equation (34)}$$

which is a joint depth and gradient optimization weighted by $\lambda$, and which may be solved by the constraint $l_1 z_x + l_2 z_y + l_3 = 0$. With standard difference, the above is a highly sparse system in z which may be solved efficiently.

At step 304, for a perspective camera, the BRDF model depends on light source and an arbitrary direction in the source-view plane, i.e., BRDF depends on s, and s-v angle. In this example, the light direction is known. The method described in step 304 is applicable to objects coated with materials like paint. In some embodiments, using three or more differential motions of the camera, BRDF terms may be eliminated to recover surface depth and a linear constraint on the gradient. The two sources of surface information may be combined in a joint optimization that is highly sparse and can better deal with noise. Modeling at step 304 may include isotropic BRDF equations as follows:

$$\log p(n, s, v) = \overline{p}(n^T s, n^T y), \quad \text{Equation (35)}$$

$$y = \frac{s+kv}{\|s+kv\|}$$

In some embodiments, the differential stereo equation that may be applied to step 304 may include the following equations:

$$p'\left(\frac{z}{1+\beta z}\right) + r'\left(\frac{1}{1+\beta z}\right) + q' = \omega^T \pi, \quad \text{Equation (36)}$$

where $$\pi = \frac{Pn^T y}{(2(1+k\emptyset))^{\frac{3}{2}}} [2k(1+k\emptyset)n - (\emptyset + k\varphi)s] \times v \quad \text{Equation (37)}$$

In some embodiments, the process illustrated in step 304 may eliminate BRDF using three or more images, in which the depth is provided by $z=\epsilon_1$, and the gradient ratio is provided by $l_1 z_x + l_2 z_y + l_3 = 0$.

One example of an image reconstruction method for use with step 304 is to recover depth directly using the equation $z=\epsilon_1$, and to regularize for smoothness with norm($[z_x, z_y]$). In another example, an image reconstruction method for use with step 304 may include solving a combined system provided by:

$$\min_z \ (z-\epsilon_1)^2 + \lambda(l_1 z_x + l_2 z_y + l_3)^2, \quad \text{Equation (38)}$$

which is a joint depth and gradient optimization weighted by $\lambda$, and which may be solved by the constraint $l_1 z_x + l_2 z_y + l_3 = 0$. With standard difference, the above is a highly sparse system in z which may be solved efficiently.

In some embodiments, the methods, systems and computer products disclosed herein model the correct dependence of surface reflectance on surface normal, lighting and viewing directions instead of assuming brightness constancy or Lambertian reflectance. A rank deficiency is recognized in the differential stereo relations that it is used to eliminate BRDF and lighting dependence. By managing to eliminate the BRDF, the methods, systems and computer products disclosed herein can handle objects that reflect light in complex ways, without need to calibrate the lighting (for perspective cameras). For orthographic cameras, BRDF-invariant expressions are derived in the form of quasilinear PDEs, which can be conveniently solved with predictable solution properties (initial conditions, accuracy and convergence behavior). For perspective cameras, linear constraints are derived on depth and gradient, which can be solved efficiently as a sparse linear system to yield surface depth with unknown BRDF and unknown light source.

In an orthographic camera, the BRDF is dependent on source and view directions (valid for materials like fabrics) when the lighting is unknown. In an orthographic camera, the BRDF is dependent on source and half-angle directions (valid for materials like plastics and metals) when the lighting is known. In an orthographic camera, the BRDF is dependent on source and arbitrary direction in source-view plane (valid for like paint) when the lighting is known.

In a perspective camera, the BRDF may be unknown or arbitrary with unknown lighting. The BRDF may be dependent on source and view directions (valid for materials like plastics and metals) with known lighting. In a perspective camera, the BRDF may be dependent on source and half-angle directions (valid for materials like plastics and metals), with known lighting. In a perspective camera, the BRDF may be dependent on source and arbitrary direction in source-view place (valid for materials like paints), having known lighting.

Figure 6:
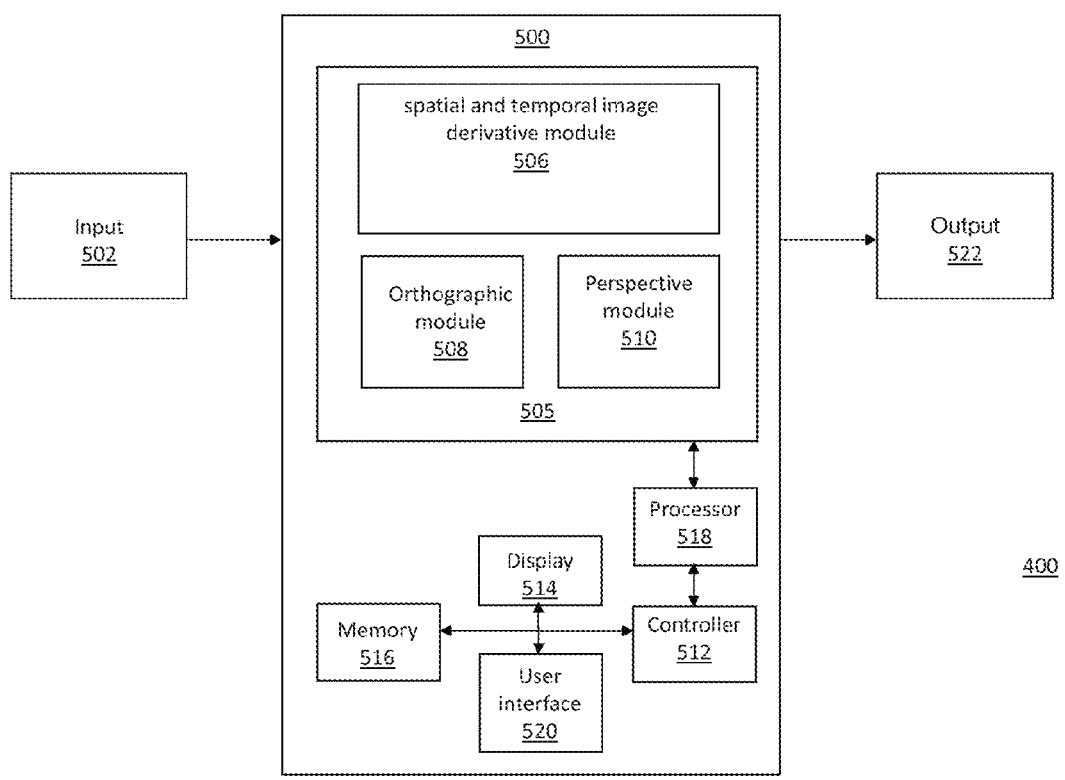
FIG. 6 shows an exemplary computer vision system to perform the methods and computer products disclosed herein, in accordance with the present disclosure.

FIG. 6 depicts one embodiment of a computer vision system 400 to perform the methods and computer products disclosed herein. In one embodiment, the system 400 preferably includes one or more processors 518, e.g., hardware processors, and memory 508, 516 for storing applications, modules and other data. In one example, the one or more processors 518 and memory 508, 506 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 400 may include one or more displays 514 for viewing. The displays 514 may permit a user to interact with the system 400 and its components and functions. This may be further facilitated by a user interface 520, which may include a mouse, joystick, or any other peripheral or control to permit user interaction with the system 400 and/or its devices, and may be further facilitated by a controller 512. It should be understood that the components and functions of the system 400 may be integrated into one or more systems or workstations. The display 514, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 400 may receive input data 502 which may be employed as input to a plurality of modules 505. The plurality of modules 505 may include a module for deriving a relationship of spatial and temporal image derivatives of an object to bidirectional reflectance distribution function (BRDF) derivatives under camera motion, which may be referred to as a spatial and temporal image derivative module 506. In one embodiment, the spatial and temporal image derivative module 506 may include instructions to execute using a processor steps 100, 101 and 102 of the method described above with reference to FIG. 2. The plurality of modules 505 may also include an orthographic module 508 and a perspective module 510. The orthographic module 508 may include instructions to execute using a processor steps 200, 201, 202 and 203 of the method described above with reference to FIG. 2. The perspective module 510 may include instructions to execute, e.g. execute using a processor, steps 300, 301, 302, 303 and 304 of the method described above with reference to FIG. 2.

The system 400 may produce output data 522, which in one embodiment may be displayed on one or more display devices 514. It should be noted that while the above configuration is illustratively depicted, it is contemplated that other sorts of configurations may also be employed according to the present principles.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium, which may be non-transitory, providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It was unknown prior to the methods, apparatus and systems disclosed herein whether shape could be recovered from camera motions under conditions of general, unknown bidirectional reflectance distribution function (BRDF). The methods, apparatus and systems disclosed herein handle shape reconstruction under challenging imaging conditions. Prior methods simply the problem of determining shape with physically incorrect assumptions like brightness constancy or diffuse reflectance. By accounting for the BRDF, the methods, apparatus and systems disclosed herein improve the accuracy of shape reconstruction.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer vision method comprising:
deriving, with a processor, a relationship of spatial and temporal image derivatives of an object to bidirectional reflectance distribution function (BRDF) derivatives under camera motion that provides an image sequence;
deriving a quasilinear partial differential equation for solving surfaced depth for orthographic projections using the relationship of spatial and temporal image derivatives to bidirectional reflectance distribution function (BRDF) derivatives;
solving the surface depth from the quasilinear partial differential equation; and
reconstructing an image of the object from the solving of the surface depth for orthographic projections,
wherein the BRDF comprises a negative incoming light direction, $\omega_i$, and outgoing direction, $\omega_r$, both defined with respect to the surface normal, n, and returns the ratio of reflected radiance exiting along $\omega_r$ to the irradiance incident on the surface from direction $\omega_i$, each direction $\omega$ is itself parameterized by azimuth angle $\phi$ and zenith angle $\theta$, therefore the BRDF as a whole is 4-dimensional and the BRDF has units $sr^{-1}$, with steradian (sr) being a unit of solid angle, therefore the BRDF as a whole is 4-dimensional and the BRDF has units $sr^{-1}$, with steradian (sr) being a unit of solid angle,
wherein the BRDF comprises $$f_r(\omega_i, \omega_r) = \frac{dL_r(\omega_r)}{dE_i(\omega_i)} = \frac{dL_r(\omega_r)}{L_i(\omega_i)\cos\theta_i d\omega_i}$$

where L is radiance, or power per unit solid-angle-in-the-direction-of-a-ray per unit projected-area-perpendicular-to-the-ray, E is irradiance, or power per unit surface area, $\emptyset_i$ is angle between $\omega_i$ and surface normal, n and index i indicates incident light, whereas index rr indicates reflected light.

2. The method of claim 1, wherein the quasilinear partial differential equation is solved using a method of characteristics.

3. The method of claim 1, wherein a shape of the object for the image is recovered from camera motion under conditions of said bidirectional reflectance distribution function (BRDF) that is unknown.

4. The method of claim 1 further comprising a non-transitory computer readable medium comprising a computer readable program for executing the method of computer vision, wherein the computer readable program is executed on a computer.

5. A system for computer vision comprising:
- a spatial and temporal image derivative module for deriving a relationship of spatial and temporal image derivatives from an object to unknown bidirectional reflectance distribution function (BRDF) derivatives under camera motion to provide an image sequence using a processor;
- an orthographic module for deriving with a processor a quasilinear partial differential equation for solving surfaced depth for orthographic projections using the relationship of spatial and temporal image derivatives to bidirectional reflectance distribution function (BRDF) derivatives, solving the surface depth from the quasilinear partial differential equation, and reconstructing an image of the object from the solving of the surface depth for orthographic projections; and
- a perspective module for estimating depth from the spatial and temporal image derivatives, deriving a constraint on surface gradient of the object, combining the depth and the constraint of the surface gradient to yield a solution for surface depth for perspective projections as a sparse linear system, and reconstructing an image of the object from the solution for surface depth for perspective projections, wherein the BRDF comprises a negative incoming light direction, $\omega_i$, and outgoing direction, $\omega_r$, both defined with respect to the surface normal, n, and returns the ratio of reflected radiance exiting along $\omega_r$ to the irradiance incident on the surface from direction $\omega_i$, each direction $\omega$ is itself parameterized by azimuth angle $\phi$ and zenith angle $\theta$, therefore the BRDF as a whole is 4-dimensional and the BRDF has unit $sr^{-1}$, with steradian (sr) being unit of solid angle, therefore the BRDF as a whole is 4-dimensional and the BRDF has units $sr^{-1}$, with steradian (sr) being a unit of solid angle, wherein the BRDF comprises $$f_r(\omega_i, \omega_r) = \frac{dL_r(\omega_r)}{dE_i(\omega_i)} = \frac{dL_r(\omega_r)}{L_i(\omega_i)\cos\theta_i d\omega_i}$$

where L is radiance, or power per unit solid-angle-in-the-direction-of-a-ray per unit projected-area-perpendicular-to-the-ray, E is irradiance, or power per unit surface area, $\emptyset_i$ is angle between $\omega_i$ and surface normal, n and index i indicates incident light, whereas index rr indicates reflected light.

6. The method of claim 1, wherein the BRDF comprises a four-dimensional function that defines how light is reflected at an opaque surface.

* * * * *